(12) United States Patent
Pietsch et al.

(10) Patent No.: US 8,100,601 B2
(45) Date of Patent: Jan. 24, 2012

(54) CONNECTION ARRANGEMENT, ESPECIALLY BETWEEN A FEED ROLLER AND A GEARBOX OF A FIELD CHOPPER

(75) Inventors: Gottfried Pietsch, Hochkirch (DE); Stefan Rauschenbach, Grosspostwitz (DE); Andreas Roth, Neunkirchen-Seelscheid (DE)

(73) Assignee: GKN Walterscheid GmbH (DE)

( * ) Notice: Subject to any disclaimer, the term of this patent is extended or adjusted under 35 U.S.C. 154(b) by 281 days.

(21) Appl. No.: 12/502,444

(22) Filed: Jul. 14, 2009

(65) Prior Publication Data

US 2010/0016087 A1 Jan. 21, 2010

(30) Foreign Application Priority Data

Jul. 18, 2008 (DE) .................. 10 2008 033 917

(51) Int. Cl.
*B25G 3/28* (2006.01)
(52) U.S. Cl. .................................. 403/359.5; 241/35
(58) Field of Classification Search ............ 403/359.5, 403/359.1, 298, 322.2, 12, 328, 369, 88; 180/226, 227, 383, 384; 464/158; 241/32, 241/101.763, 35, 222, 101.74, 101.75; 56/14.1
See application file for complete search history.

(56) References Cited

U.S. PATENT DOCUMENTS

| | | | |
|---|---|---|---|
| 2,651,162 A * | 9/1953 | Whisler | 56/13.9 |
| 3,261,222 A | 7/1966 | Fresmann et al. | |
| 4,278,210 A * | 7/1981 | Priepke | 241/222 |
| 4,496,105 A * | 1/1985 | Fleming et al. | 241/32 |
| 4,523,871 A * | 6/1985 | Recker | 403/12 |
| 5,374,135 A * | 12/1994 | Folsom et al. | 403/369 |
| 5,582,489 A * | 12/1996 | Marzio et al. | 403/354 |
| 5,688,067 A * | 11/1997 | Straub | 403/305 |
| 6,009,609 A | 1/2000 | Hanno | |
| 6,467,565 B1 * | 10/2002 | Handa et al. | 180/383 |
| 6,582,151 B2 * | 6/2003 | Hopson | 403/359.5 |
| 7,635,235 B2 * | 12/2009 | Riehle | 403/359.5 |
| 7,946,374 B2 * | 5/2011 | Kofuji | 180/226 |
| 2003/0153426 A1 * | 8/2003 | Brown | 475/210 |

FOREIGN PATENT DOCUMENTS

| | | |
|---|---|---|
| DE | 883 999 | 7/1953 |
| DE | 1 530 601 | 10/1969 |
| DE | 2 001 625 | 7/1971 |
| DE | 42 14 204 B4 | 2/2004 |

* cited by examiner

*Primary Examiner* — Arpad Fabian-Kovacs
(74) *Attorney, Agent, or Firm* — Harness, Dickey & Pierce, P.L.C.

(57) ABSTRACT

A connection arrangement between a feed roller and a gearbox of a field chopper has a first shaft (25) with a central bore (26) that is rotatingly supported around an axis of rotation D, in a gearbox housing (30). A second shaft (32) is connected to a feed roller. The second shaft (32) is rotatingly supported around the axis of rotation D. The second shaft (32) has a central bore (33) that is aligned with the central bore (26) of the first shaft (25). A connecting journal (37) rests in the central bore (26) of one of the two shafts (25). The connecting journal (37) is form-fittingly connected to the central bore for torque transmission. It is axially displaceable along the axis of rotation D between a connected position where it is inserted into the central bore (33) of the other of the two shafts (32), and a released position, where it is pulled out of the central bore (33) of the other of the two shafts (32). The connecting journal (37) is form-fittingly connected, in the connected position, to the other of the two shafts (32).

13 Claims, 3 Drawing Sheets

CONNECTION ARRANGEMENT, ESPECIALLY BETWEEN A FEED ROLLER AND A GEARBOX OF A FIELD CHOPPER

CROSS-REFERENCE TO RELATED APPLICATION

This application claims priority to German Patent Application No. 102008033917.2, filed Jul. 18, 2008, which application is herein expressly incorporated by reference.

FIELD

The disclosure relates to a connection arrangement, especially between a feed roller and a gearbox of a field chopper.

BACKGROUND

Field choppers serve to harvest and chop a harvested good. The field chopper has a mower. The harvested good is transported by a front attachment to the mower. A delivery element delivers the harvested good further to an intake unit of the field chopper. The intake unit has several pairs of feed rollers which the flow of the harvested goods is passed between. The feed rollers are driven by intake gearboxes. From the intake unit, the flow of harvested goods is guided further to a knife drum. The harvested good is chopped. Generally a cracker unit for breaking-up the seeds is arranged to follow the knife drum. The harvested good is transported from there to an accelerator. The accelerator delivers the harvested good through an ejection channel to the outside. Thus, the harvested good can be transferred onto a loading vehicle.

For maintenance purposes it is necessary to be able to remove the feed rollers of the intake unit. The shafts of the feed rollers are generally connected via spline connection, i.e., via longitudinal teeth, to shafts of the driving gearbox. The shafts of the feed rollers have, for this, generally a shaft end with longitudinal teeth on its outer circumferential face. The shaft ends are inserted into hollow shafts with correspondingly formed inner longitudinal teeth. In order to remove the feed rollers, the bearing at the side facing away from the shaft end of the feed roller has to be detached. Thus, the feed rollers can be initially axially displaced such that the shaft end can be pulled out of the hollow shaft of the gearbox. The feed roller can then be removed to the front, when seen in driving direction of the field chopper.

SUMMARY

It is an object of the disclosure to provide a connection between a gearbox and a feed roller that enables a simpler disassembly of the feed roller.

The object is solved by a connection arrangement, especially between a feed roller and a gearbox of a field chopper, that comprises a first shaft that is rotatingly supported in a gearbox housing around an axis of rotation. The first shaft has a central bore. A second shaft is connected to a feed roller. The second shaft is rotatingly supported around the axis of rotation. The second shaft has a central bore that is aligned with the bore of the first shaft. A connecting journal rests in the bore of one of the two shafts. The connecting journal is form-fittingly connected to one of the shafts for torque transmission. The journal is axially displaceable along the axis of rotation between a connected position and a release portion. In the connected position, the journal is inserted into the bore of the other of the two shafts. In the released position, the journal is pulled out of the bore of the other of the two shafts. The connecting journal is form-fittingly connected in the connected position to the other of the two shafts.

Thus, the connection between the second shaft of the feed roller and the first shaft of the gearbox can be detached in a simple manner. Only the connecting journal has to be displaced from its connected position into its released position. In the released position, the connecting journal is not arranged in the bore of the other of the two shafts. The two shafts are coaxially arranged to each other and are arranged next to each other in the longitudinal direction of the axis of rotation. The feed roller can be removed by simply moving it forward in the driving direction of the field chopper. The second shaft can be moved in a radial direction relative to the axis of rotation. The axial displacement of the second shaft or of the feed roller is not necessary.

In this case, in a preferred embodiment, the connecting journal rests in the bore of the first shaft. In the connected position, the journal is inserted into the bore of the second shaft. In the released position, the journal is pulled out of the bore of the second shaft.

The first shaft is formed as a hollow shaft. The connecting journal can be inserted into the bore of the hollow shaft from the side of the hollow shaft opposite to the second shaft. Thus, the connecting journal is accessible from the side facing away from the second shaft. The journal can be actuated from this side to displace the connecting journal between the connected position and the released position.

The first shaft is guided out of the side of the gearbox housing facing away from the second shaft. Thus, an advantageous accessibility to the connecting journal exists. Accordingly, a simple handling of the second shaft is achieved during disassembly.

The connecting journal can have longitudinal teeth on an outer circumferential face. The outer circumferential teeth engage longitudinal teeth in an inner circumferential face of the bore of the first shaft. Thus, a secure torque transmission exists between the first shaft and the connecting journal.

Additionally, the connecting journal has an outer circumferential face with longitudinal teeth that engage, in the connected position, with longitudinal teeth in an inner circumferential face of the bore of the second shaft.

In this case, the connecting journal has a single longitudinal tooth on its outer circumferential face. The tooth engages in the longitudinal teeth of the first shaft as well as in the longitudinal teeth of the second shaft. Alternatively, the connecting journal includes two longitudinal teeth on the outer circumferential face that, respectively, engage in one of the longitudinal teeth of the bores. The longitudinal teeth can be arranged differently on large diameters.

A radial play is provided between the longitudinal teeth of the connecting journal and the longitudinal teeth of the second shaft to be able to compensate for angular deviations, in a limited manner, between the first shaft and the second shaft. In this case, the radial play can be set larger than it is commonly provided in longitudinal teeth of this type. Furthermore, the longitudinal teeth of the connecting journal and/or the longitudinal teeth of the second shaft can be formed comparatively short. This compensates for angular deviations without jamming. Alternatively, the longitudinal teeth on the connecting journal can also be formed as spiral teeth to enable tilting.

The second shaft has a centering journal that rests, in the connected position of the connecting journal, in a centering recess of the connecting journal. This accurately centers the connecting journal relative to the second shaft. In this case, the outer face of the centering journal is formed at least partially spherically. Accordingly, this enables angular deviations between the connecting journal and the second shaft.

The bore of the second shaft is formed as a blind hole where a centering element rests. The centering element includes the centering journal.

A sleeve is provided that axially displaceable rests on one of the two shafts. Preferably, it rests on the second shaft. In a locked position, the sleeve partially accommodates, additionally, the other of the two shafts, preferably the first shaft.

Further areas of applicability will become apparent from the description provided herein. The description and specific examples in this summary are intended for purposes of illustration only and are not intended to limit the scope of the present disclosure.

DRAWINGS

Preferred embodiments of the disclosure are described in detail in the following using the drawings.

DETAILED DESCRIPTION

Figure 1:
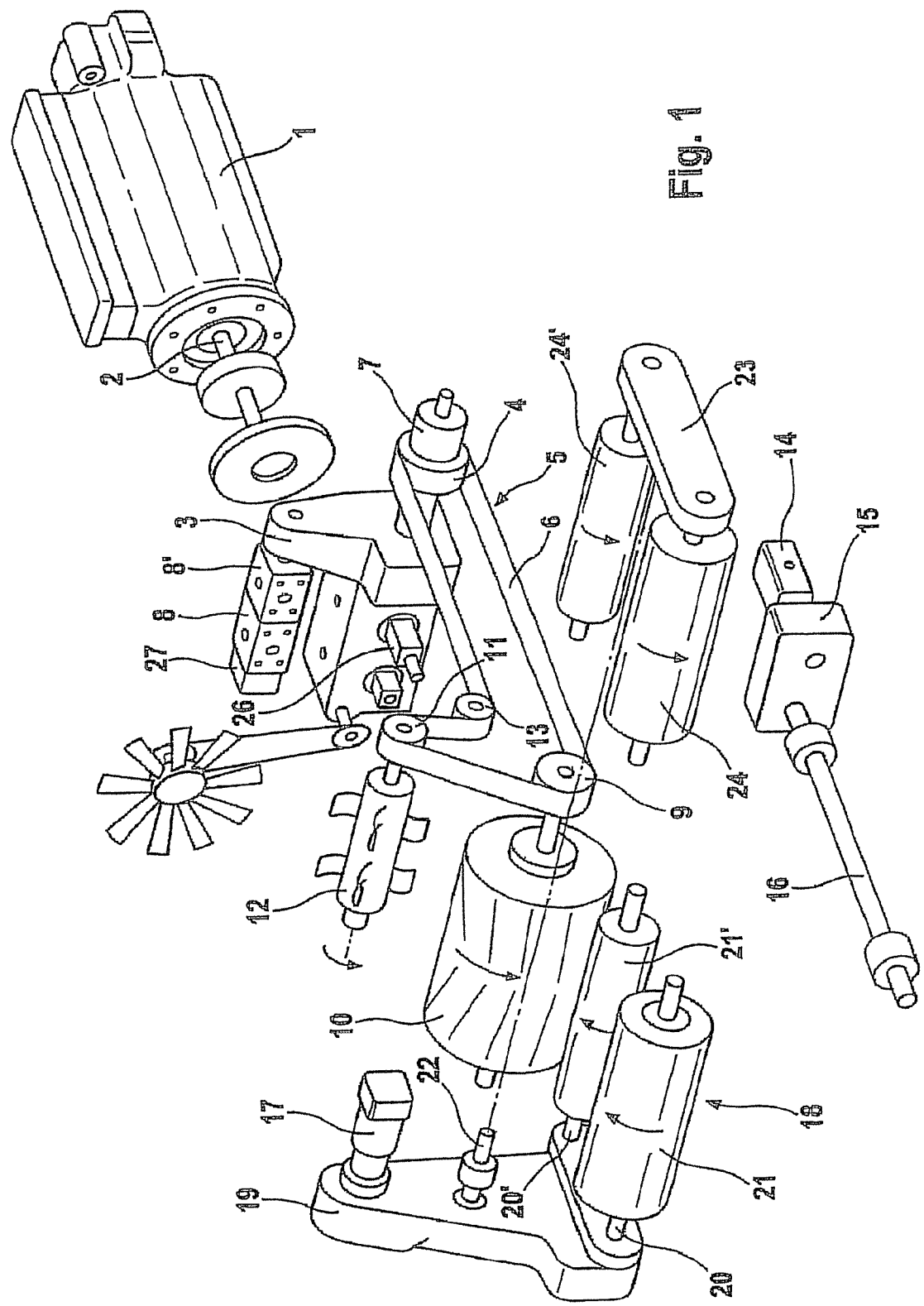
FIG. 1 is a perspective exploded view of a drive arrangement of a field chopper.

FIG. 1 is a perspective exploded view of a drive of a field chopper. The drive includes a drive motor 1 in the form of an internal combustion engine. The drive motor 1 is connected, drive-wise, via a crankshaft 2, to a motor driven gearbox 3. The motor driven gearbox 3 is formed as a transfer case and drives inter alia a belt pulley 4. The belt pulley 4 serves as a drive belt pulley for a belt drive 5 and drives a belt 6. The drive belt pulley 4 can be selectively separated or connected to the drive of the motor driven gearbox 3 by a release clutch 7. Thus, when the drive motor 1 is running, the belt drive 5 can be switched off. Furthermore, via the release clutch 7, a first hydraulic pump 8 is selectively switched on or off. A drive shaft, for driving the first hydraulic pump 8, is drive-wise connected to the drive belt pulley 4.

The belt drive 5 further includes a first output belt pulley 9 to drive a knife drum 10. The knife drum 10 chops a flow of harvested goods. The flow of harvested goods is delivered by the knife drum 10 to an acceleration drum 12. From the acceleration drum 12, the harvested goods are transported further via an ejection channel, not shown. The acceleration drum 12 is driven by a second output belt pulley 11 of the belt drive 5. In the present case, the second output belt pulley 11 is arranged at the loose side of the belt drive 5 between the drive belt pulley 4 and the first output belt pulley 9. A belt tensioning device 13 to tension the belt 6 is arranged, when seen in movement direction of the belt 6, at the loose side.

The first hydraulic pump 8 is connected, via hydraulic lines not shown here, to a first hydraulic motor 14 that it hydraulically drives. The first hydraulic motor 14 is connected drive-wise to a gearbox 15. The gear box 15 is connected at the output side to a propeller shaft arrangement 16 to drive an attachment not shown here such as a pick-up and/or transversal conveyor.

The first hydraulic pump 8 is connected to a further first hydraulic pump 8'. In the present case, there are two first hydraulic pumps 8, 8' arranged directly one behind the other. Generally, it would, however, also be conceivable, that only one first hydraulic pump is used. The further first hydraulic pump 8' is connected to a second hydraulic motor 17 to drive an intake unit 18. However, it is also conceivable, that the two first hydraulic pumps 8, 8' drive in a common hydraulic circuit the first hydraulic motor 14 and the second hydraulic motor 17. In the present case, the second hydraulic motor 17 is connected, via not shown hydraulic lines, to the further first hydraulic pump 8' that drives it. The second hydraulic motor 17 is drive-wise connected to a first intake gearbox 19. The first pulling-in gearbox 19 has several output shafts 20, 20', 20". The shafts 20, 20', 20", respectively, are drive-wise connected to lower feed rollers 21, 21' that they rotatingly drive. The first pulling-in gearbox 19 is also connected to a second intake gearbox 23 via a propeller shaft 22. The upper feed rollers 24, 24' are rotatingly driven by the gearbox 23. The intake unit 18 delivers a flow of harvested goods to the intake drum 10.

Figure 2:
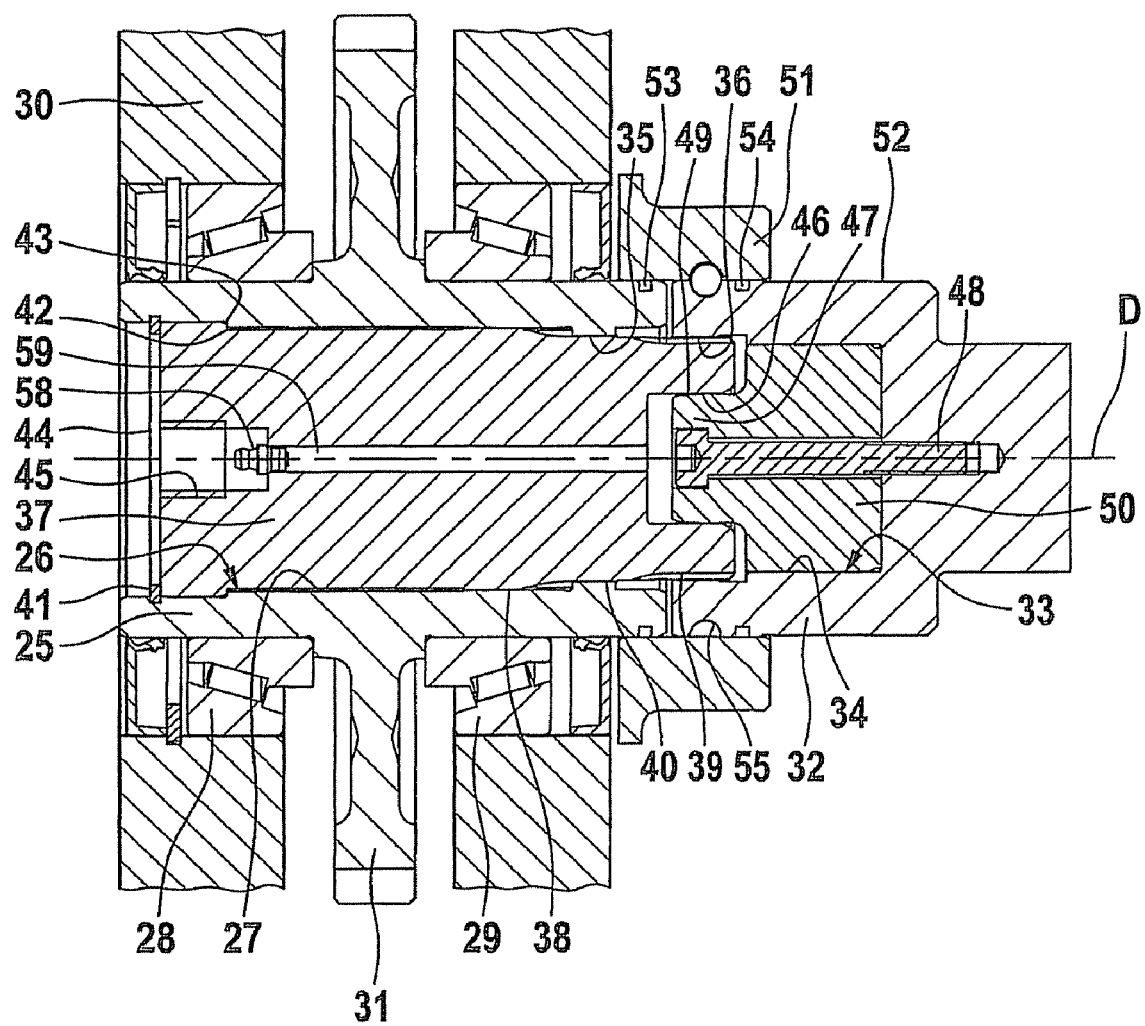
FIG. 2 is a longitudinal sectional view of a connection arrangement according to the disclosure.
Figure 3:
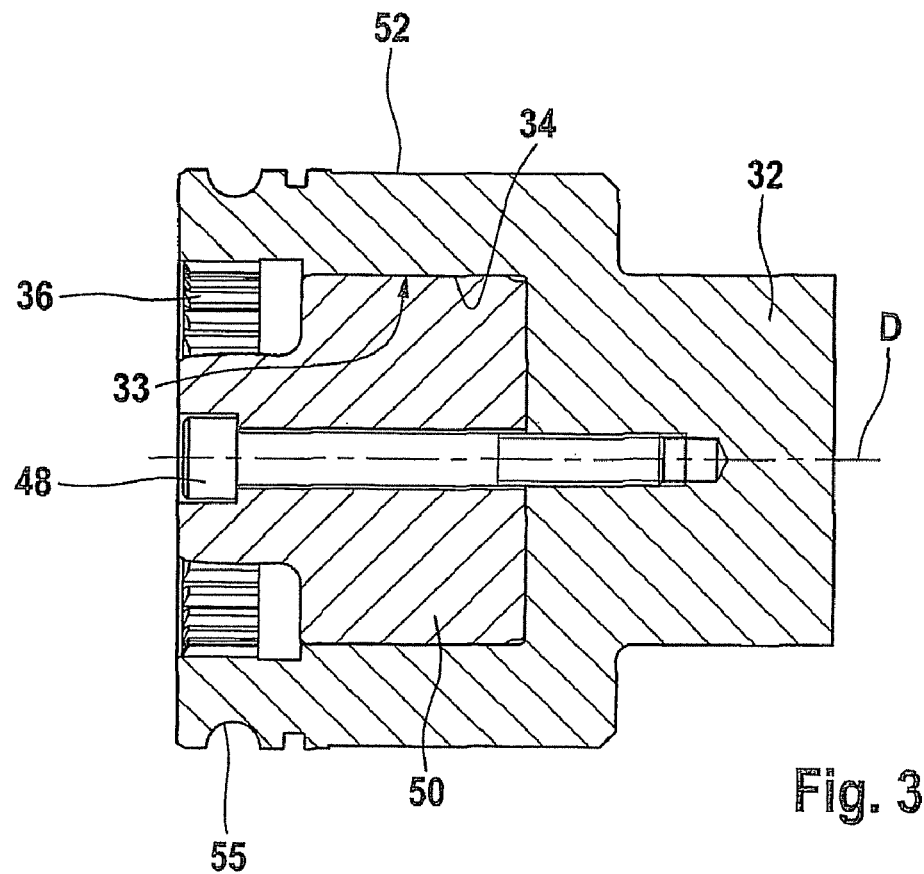
FIG. 3 is a longitudinal sectional view of the first shaft.
Figure 4:
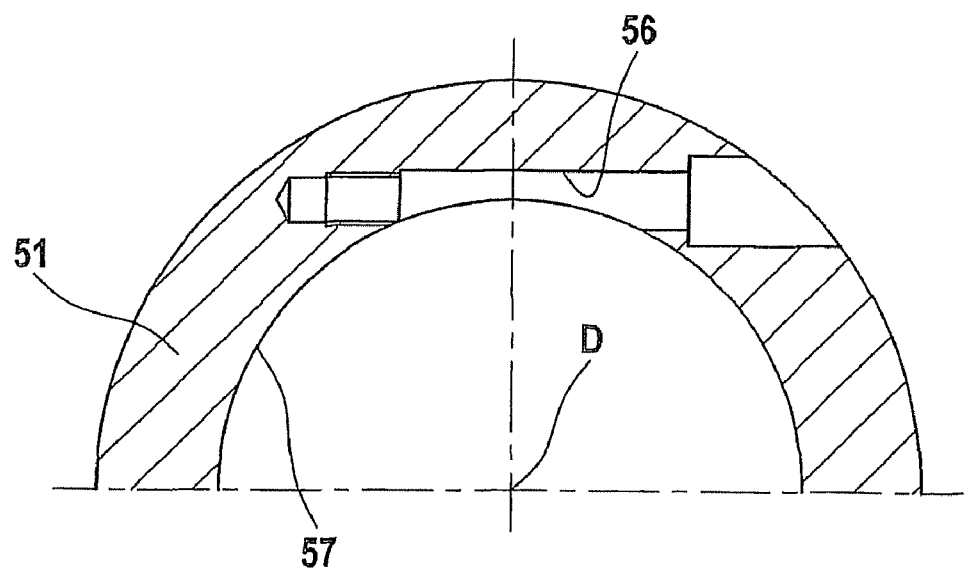
FIG. 4 is a half transversal sectional view of the sleeve.

FIGS. 2 to 4 show a connection arrangement according to the disclosure between one of the output shafts of the intake gearbox according to FIG. 1 and the feed rollers. The drive shaft shown in FIGS. 2 to 4 includes a first hollow shaft 25 with a through bore 26. The bore 26 has an inner circumferential face 27. The first shaft 25 is rotatingly supported around an axis of rotation D via tapered rolling member bearings 28, 29 in a gearbox housing 30. Further, the first shaft 25 is integrally connected to a spur gear 31 of a gearbox step. The spur gear 31 meshes with a further spur gear of the intake gearbox, not shown here. The first shaft 25 is driven via the spur gear 31.

The connection arrangement further includes a second shaft 32. The second shaft 32 is also rotatingly arranged around the axis of rotation D. The second shaft 32 is arranged relative to the axis of rotation D neighboring the first shaft 25. A central blind hole 33 is at the end of the second shaft 32, facing the first shaft 25. The central blind hole 33 has an inner circumferential face 34 arranged coaxially to the axis of rotation D.

Longitudinal teeth 35 are provided in the inner circumferential face 27 of the through bore 26 and at the end of the through bore 26 facing the second shaft 32. Additionally, longitudinal teeth 36 are provided in the inner circumferential face 34 of the blind hole 33 at the end facing the first shaft 25. A connecting journal 37 is provided for the transmission of torque between the first shaft 25 and the second shaft 32. The connecting journal 37 rests in the through bore 26 of the first shaft 25. The connecting journal 37 can be inserted into the bore 26 from the end of the through bore 26, facing away from the second shaft 32, until the connecting journal 37 has reached a connected position, as it is shown in FIG. 2. In the connected position, the connecting journal 37 projects from the end of the through bore 26, facing the second shaft 32. The connecting journal 37 enters the blind hole 33 of the second shaft 32. The connecting journal 37 can be pulled to the left in the view shown in FIG. 2, till the connecting journal 37 reaches a released position. In the release position, the connecting journal 37 is pulled completely out of the blind hole 33 or does not project anymore in direction to the second shaft 32 from the through bore 26.

Two longitudinal teeth 39, 40 are worked into an outer circumferential face 38 of the connecting journal 37 for torque transmission. The teeth 39 are provided at the end of the connecting journal 37 facing the second shaft 32. The teeth 40 are arranged axially behind the teeth 39. One of the longitudinal teeth 39 engages, in the connected position, the longitudinal teeth 36 of the blind hole 33. In the connected position, the other longitudinal teeth 40 of the connecting journal 37 engage in the longitudinal teeth 35 of the through bore 26. Thus, torque can be transmitted from the first shaft 25 via the longitudinal teeth 35, 40 and, then, via the longitudinal teeth 39, 36 onto the second shaft 32. If the connecting journal 37 is displaced into its released position, the longitudinal teeth 39 of the connecting journal 37 do not engage the longitudinal teeth 36 of the second shaft 32. Thus, no transmission of a torque is carried out. Furthermore, in this position, the second shaft 32 can be displaced radially relative to the axis of rotation D, to remove, for example, the auger.

The connecting journal 37 in the connected position is held by a securing ring 41 that rest in a circumferential groove 44 of the through bore 26. In this position the connecting journal 37 is supported in a direction towards the second shaft 32. A connecting journal shoulder 43 abuts a shoulder face 42 of the through bore 26. The securing ring 41 is removed from the circumferential groove 44 to displace the connecting journal 37. A thread bore 45 receives a tool to displace the connecting journal 37. The threaded bore 45 is coaxially positioned on the axis of rotation D at the end of the connecting journal 37 facing away from the second shaft 32. A tool can be screwed into the bore 45 to connect it with the connecting journal 27 to pull the connecting journal 37 out of the second shaft 32.

The connecting journal 37 has an end-sided centering recess 46, in the form of a blind hole, at the end of the connecting journal 37 facing the second shaft 32. In the connected position, a centering journal 47 of the second shaft 32 enters into the centering recess 46. The centering journal 47 and the centering recess 46 are arranged coaxially on the axis of rotation D. The centering journal 47 is part of a centering element 50 that sits in the blind hole 33 of the second shaft 32. The centering journal 47 is secured by an attachment screw 48. The centering journal 47 has a spherical outer face 49. The outer face 49 enables the centering journal 47 to carry out small angular movements relative to the connecting journal 37. Additionally, it can compensate for angular deviations between the first shaft 25 and the second shaft 32. An enlarged radial play is provided to improve the compensation for angular deviations between the longitudinal teeth 36 of the blind hole 33 of the second shaft 32 and the longitudinal teeth 39 of the connecting journal 37, meshing with the same. A larger radial play is provided than is common in longitudinal teeth for the transmission of a torque. Furthermore, the axial engaging length of the longitudinal teeth 36, 39, which engage each other, is formed relatively short. Thus, the second shaft 32 can still compensate for small angular deviations even though the longitudinal teeth 36, 39 are engaged with each other. The longitudinal teeth 39 of the connecting journal 37 can also be formed as spiral teeth that engage in straight longitudinal teeth 36 of the second shaft 32. Thus, in a simple manner, angular deviations can be compensated. When providing spiral teeth, no increased radial play is necessary. However, because of cost reasons, the variant with two straight longitudinal teeth that engage each other and have an increased radial play can be provided.

The second shaft 32 has an outer face 52. A sleeve 51 is axially displaceably arranged on the outer face 52. In FIG. 2, the sleeve is shown in a locked position. Here, the first end of the second shaft 32, facing the first shaft 25, and the end of the first shaft 25, facing the second shaft 32, enters a bore 57 of the sleeve 51. In the locked position, the sleeve 51 is sealed relative to the first shaft 25 by a sealing ring 53. It is sealed relative to the outer face 52 of the second shaft 32 by a sealing ring 54. Thus, the longitudinal teeth 35, 36, 39, 40 are sealed to the outside. A lubricating nipple 58 is connected to a lubricating duct 59 in the connecting journal 37. The lubricating duct 59 ends in the centering recess 46 to provide lubricant to lubricate the longitudinal teeth 35, 36, 39, 40.

A securing bore 56 is provided in the sleeve 51 that crosses the axis of rotation D, with a distance, and partially intersects sleeve bore 57. In the locked position, the securing bore 56 is arranged axially in the same position, as an outer circumferential groove 55 in the outer face 52 of the second shaft 32. A securing screw, not shown here, is screwed into the securing bore 56. The screw enters into the outer circumferential groove 55 and axially secures the sleeve 51 with the second shaft 32. The sleeve 51 is detached from the second shaft 32 by removing the securing screw from the securing bore 56. Thus, the sleeve 51 can be pushed to the right in the view of FIG. 2 until the sleeve 51 is completely arranged on the outer face 52 of the second shaft 32 or until the end of the connecting journal 37, facing the second shaft 32, is not arranged anymore in the bore 57 of the sleeve 51.

As a whole, the second shaft 32 is axially displaceable relative to the first shaft 25. The longitudinal teeth 36, 39 enable this. Furthermore, the sleeve 51 also allows a displacement. The whole connection arrangement enables a moveable bearing for the to be driven feed roller.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A connection arrangement between a feed roller and a gearbox of a field chopper, comprising:
    a first shaft with a central bore is rotatingly supported in a gearbox housing around an axis of rotation;
    a second shaft connected to a feed roller is rotatingly supported around the axis of rotation, the second shaft has a central bore aligned with the central bore of the first shaft;
    a connecting journal rests in the central bore of one of the two shafts, the connecting journal is form-fittingly connected in the bores for torque transmission, the connecting journal is axially displaceable along the axis of rotation between a connected position, where connecting journal is inserted into the central bore of the other of the two shafts engaging the other of the two shafts for torque transmission and a released position, where connection journal is pulled out of the central bore of the other of the two shafts disengaging from the other of the two shafts.

2. The connection arrangement according to claim 1, wherein the connecting journal rests in the central bore of the first shaft and in the connected position is inserted into the central bore of the second shaft and in the released position, the connecting journal is pulled-out off the central bore of the second shaft.

3. The connection arrangement according to claim 1, wherein that the first shaft is formed as a hollow shaft and the connecting journal can be inserted, starting from a side of the first shaft opposite to the second shaft, into the central bore of the first shaft.

4. The connection arrangement according to claim 1, wherein the first shaft is guided out of the side of the gearbox housing facing away from the second shaft.

5. The connection arrangement according to claim 1, wherein the connecting journal has outer circumferential longitudinal teeth that engage in in inner circumferential longitudinal teeth of the central bore of the first shaft.

6. The connection arrangement according to claim 1, wherein the connecting journal has outer circumferential longitudinal teeth that engage, in the connected position, with inner circumferential longitudinal teeth of the central bore of the second shaft.

7. The connection arrangement according to claim 6, wherein a radial play that allows limited angular deviations between the first shaft and the second shaft, is provided between the longitudinal teeth of the connecting journal and the longitudinal teeth of the second shaft.

8. The connection arrangement according to claim 1, wherein the second shaft has a centering journal that rests, in the connected position, in a centering recess of the connecting journal.

9. The connection arrangement according to claim 8, wherein the centering journal has an at least partially spherical outer face.

10. The connection arrangement according to claim 1, wherein the central bore of the second shaft is formed as a blind hole, where a centering element rests, said centering element includes a centering journal element.

11. The connection arrangement according to claim 1, wherein a sleeve is axially displaceably on one of the two shafts, said sleeve partially accommodates, in a locking position, the other of the two shafts.

12. A connection arrangement between a feed roller and a gearbox of a field chopper, comprising:
 a first shaft with a central bore is rotatingly supported in a gearbox housing around an axis of rotation;
 a second shaft connected to a feed roller is rotatingly supported around the axis of rotation, the second shaft has a central bore aligned with the central bore of the first shaft;
 a connecting journal rests in the central bore of one of the two shafts, the connecting journal is form-fittingly connected to the central bore for torque transmission, the connecting journal is axially displaceable along the axis of rotation between a connected position, where said connection journal is inserted into the central bore of the other of the two shafts engaging the other of the two shafts for torque transmission and a released position, where said connection journal is pulled out of the central bore of the other of the two shafts disengaging from the other of the two shafts; and
 the first shaft is formed as a hollow shaft and the connecting journal can be inserted, starting from the side of the first shaft opposite to the second shaft, into the central bore of the first shaft.

13. A connection arrangement between a feed roller and a gearbox of a field chopper, comprising:
 a first shaft with a central bore is rotatingly supported in a gearbox housing around an axis of rotation;
 a second shaft connected to a feed roller is rotatingly supported around the axis of rotation, the second shaft has a central bore aligned with the central bore of the first shaft; and
 a connecting journal rests in the central bore of one of the two shafts, the connecting journal is form-fittingly connected to the central bore for torque transmission, the connecting journal is axially displaceable along the axis of rotation relative to the first shaft and the second shaft between a connected position, where said connection journal is inserted into the central bore of the other of the two shafts engaging the other of the two shafts for torque transmission and a released position, where said connection journal is pulled out of the central bore of the other of the two shafts disengaging from the other of the two shafts.

* * * * *